(12) United States Patent
Fanning

(10) Patent No.: US 6,604,186 B1
(45) Date of Patent: Aug. 5, 2003

(54) METHOD FOR DYNAMICALLY ADJUSTING MEMORY SYSTEM PAGING POLICY

(75) Inventor: Blaise B. Fanning, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/421,456

(22) Filed: Oct. 19, 1999

(51) Int. Cl.$^7$ .............................................. G06F 12/00
(52) U.S. Cl. ....................................... 711/209; 711/154
(58) Field of Search ................................. 711/202, 209, 711/215, 118, 122, 133, 154

(56) References Cited

U.S. PATENT DOCUMENTS 5,809,563 A  * 9/1998 Yamada et al. ............. 711/207

6,052,134 A  * 4/2000 Foster ......................... 345/521
6,199,145 B1 * 3/2001 Ajanovic et al. ........... 711/149

OTHER PUBLICATIONS

Competitive paging with locality of reference. Allan Borodin, Prabhakar Raghavan, Sandy Irani, Baruch Schieber. Proceedings of the twenty–third annual ACM symposium on Theory of computing Jan. 1991.*

* cited by examiner

*Primary Examiner*—Matthew Kim
*Assistant Examiner*—Matthew D. Anderson
(74) *Attorney, Agent, or Firm*—Blakely, Sokoloff, Taylor & Zafman LLP

(57) ABSTRACT

A method and apparatus of dynamically adjusting a memory system's existing paging policy is disclosed. In one embodiment, the method for dynamically adjusting the paging policy generates a select signal according to at least one input signal and the existing paging policy to the memory system and proceeds to modify the existing paging policy basing on the generated select signal.

24 Claims, 5 Drawing Sheets

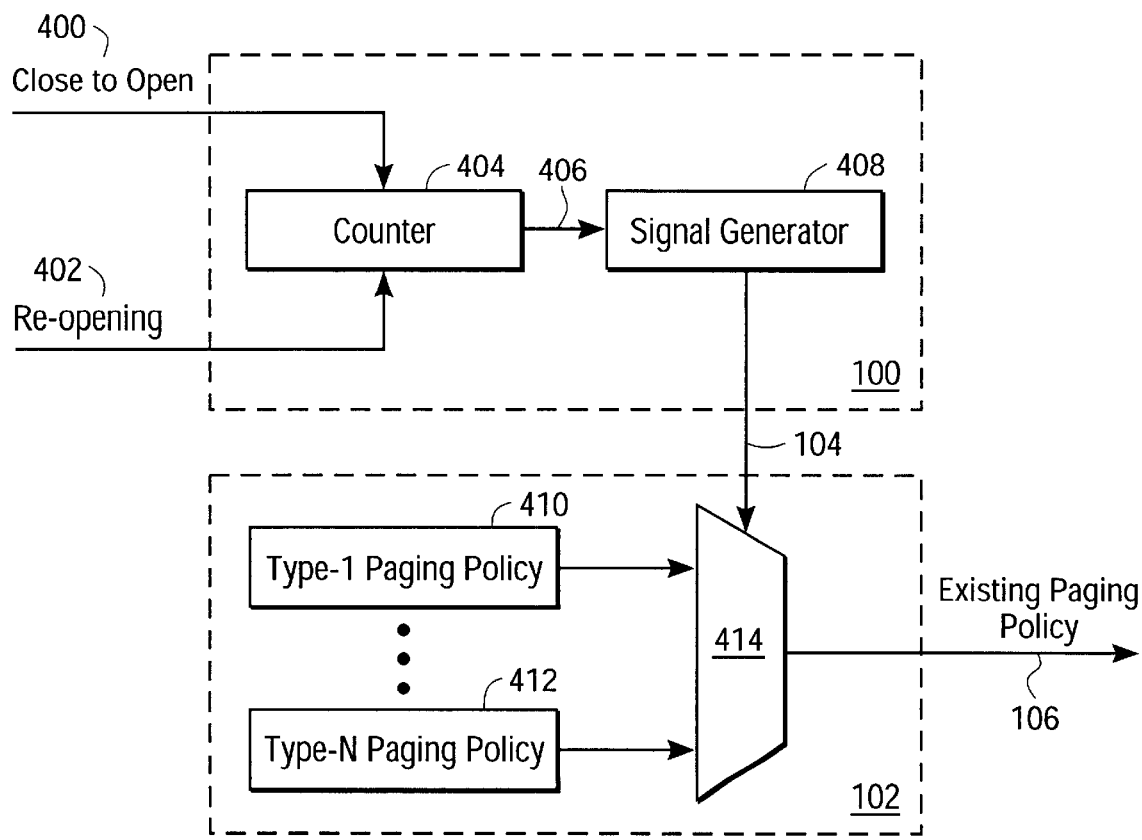

METHOD FOR DYNAMICALLY ADJUSTING MEMORY SYSTEM PAGING POLICY

FIELD OF THE INVENTION

This invention relates to memory technologies generally and particularly to a paging policy in a memory system.

BACKGROUND OF THE INVENTION

As computer applications become increasingly complex, they also rely heavily on the efficient utilization of fast memory subsystems. Dynamic Random Access Memory (hereinafter DRAM) is one such memory commonly used in computer systems. DRAM is logically organized into "pages", where a typical page covers between 1 kbytes and 64 kbytes of memory. A page is either in an "open" or "closed" state. When a page is "open", a system memory controller has instructed a memory device to make its memory information contained in that page immediately available to future commands. On the other hand, when a page is "closed", the information is only available after the memory controller has instructed the DRAM to open the page.

In addition, the memory subsystem is often divided into regions, or banks, accessible through a single "page window". Each of these banks may contain many times the number of bytes that are available through the single page window. For example, a DRAM device with a 1 kbyte page window might have banks that are 512 kbytes each. Thus, applying the aforementioned "open" rules to this DRAM device, the device only has 1/512 of its individual bank available for immediate access at any given time. In order to further improve data access to and from the device, a DRAM memory controller's "paging policy" attempts to effectively manage which pages to keep open and which pages to proactively close.

Traditionally, paging polices are simple. Often pages are left open until either a "bank conflict" occurs or the DRAM memory controller becomes unable to track a large number of open pages. In other cases, pages are closed immediately after their data are accessed. This type of paging policy results in no immediate accesses to data but a high probability of avoiding time-consuming bank conflicts. Such a paging policy also allows for faster access within the same page.

However, due to the dynamic nature of user behavior and computer applications, determining in advance the best paging policy for a given system is often impractical. In such situations, in order to improve system performance, a method and apparatus is needed to create more than one paging policy and to dynamically switch between them.

SUMMARY OF THE INVENTION

A method and apparatus of dynamically adjusting a memory system's existing paging policy is disclosed. In one embodiment, the method for dynamically adjusting the paging policy generates a select signal according to at least one input signal and the existing paging policy to the memory system and proceeds to modify the existing paging policy basing on the generated select signal.

BRIEF DESCRIPTION OF THE DRAWINGS

The present invention is illustrated by way of example and is not limited by the figures of the accompanying drawings, in which like references indicate similar elements, and in which:

FIG. 3 illustrates an example of a memory entry table.

FIG. 4 illustrates a detailed block diagram of one embodiment of a select-signal generator and a paging policy modifier.

DETAILED DESCRIPTION

A method and apparatus of dynamically adjusting a memory system's existing paging policy is described. In the following description, numerous specific details are set forth such as counters, memory controllers, non-aggressive and aggressive paging policies, etc. in order to provide a thorough understanding of the disclosed method and apparatus. However, it will be apparent to one of ordinary skill in the art that the disclosure may be practiced without these particular details. In other instances, well-known elements and theories, such as memory systems, paging policies, page hit, page miss, page empty, selector, FOR loops, etc., have not been discussed in special details in order to avoid obscuring the disclosure.

An "existing paging policy" is used throughout the written description to refer to the adopted paging policy of a memory system. On the other hand, "distinctive paging policies" refer to various paging policy schemes, which are accessible by the memory system. Therefore, the memory system is capable of replacing the existing paging policy with another paging policy chosen from the distinctive paging policies.

Figure 1:
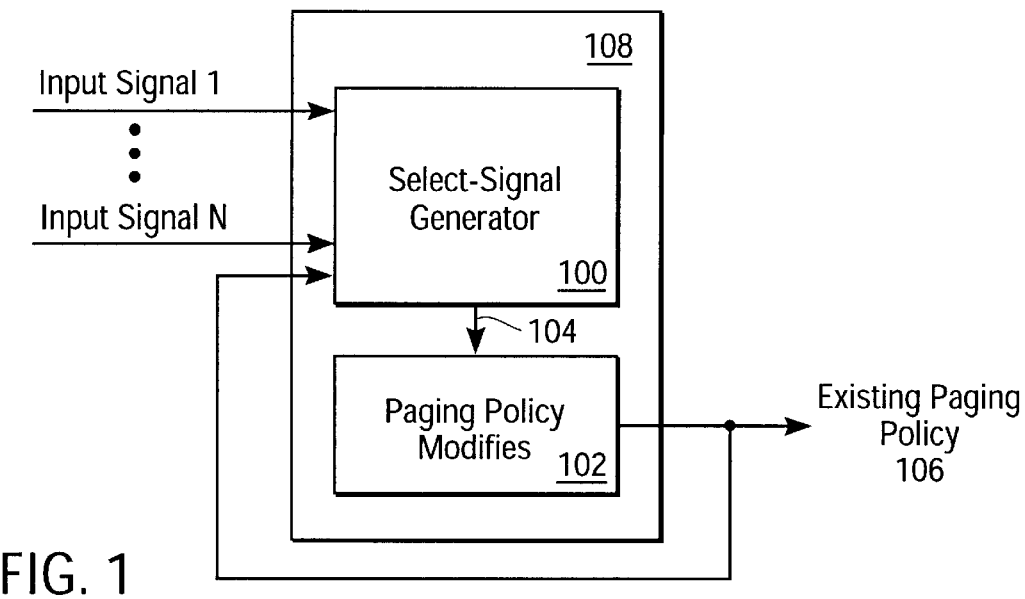
FIG. 1 illustrates a general block diagram of one embodiment of a paging policy selector.

FIG. 1 is a general block diagram of one embodiment of a paging policy selector, which dynamically adjusts its associated memory system's existing paging policy. Referring to FIG. 1, paging policy selector 108 comprises select-signal generator 100 and paging policy modifier 102. Specifically, select-signal generator 100 receives various input signals indicative of status information of existing paging policy 106. Some examples of these input signals are, but not limited to, occurrences of re-opening pages or occurrences of closing-before-opening pages. Detailed discussions of these signals will follow in subsequent sections. According to the input signals and the existing paging policy 106, select-signal generator 100 generates and transmits select signal 104 to paging policy modifier 102. Then paging policy modifier 102 either maintains or modifies existing paging policy 106 based on select signal 104.

In one embodiment, the described paging policy selector is part of a memory controller, which resides in an electronic system. Some examples of the electronic system are, but not limited to, standalone electronic apparatuses and general-purpose computer systems. A general-purpose computer system 200 is illustrated in FIG. 2.

Figure 2:
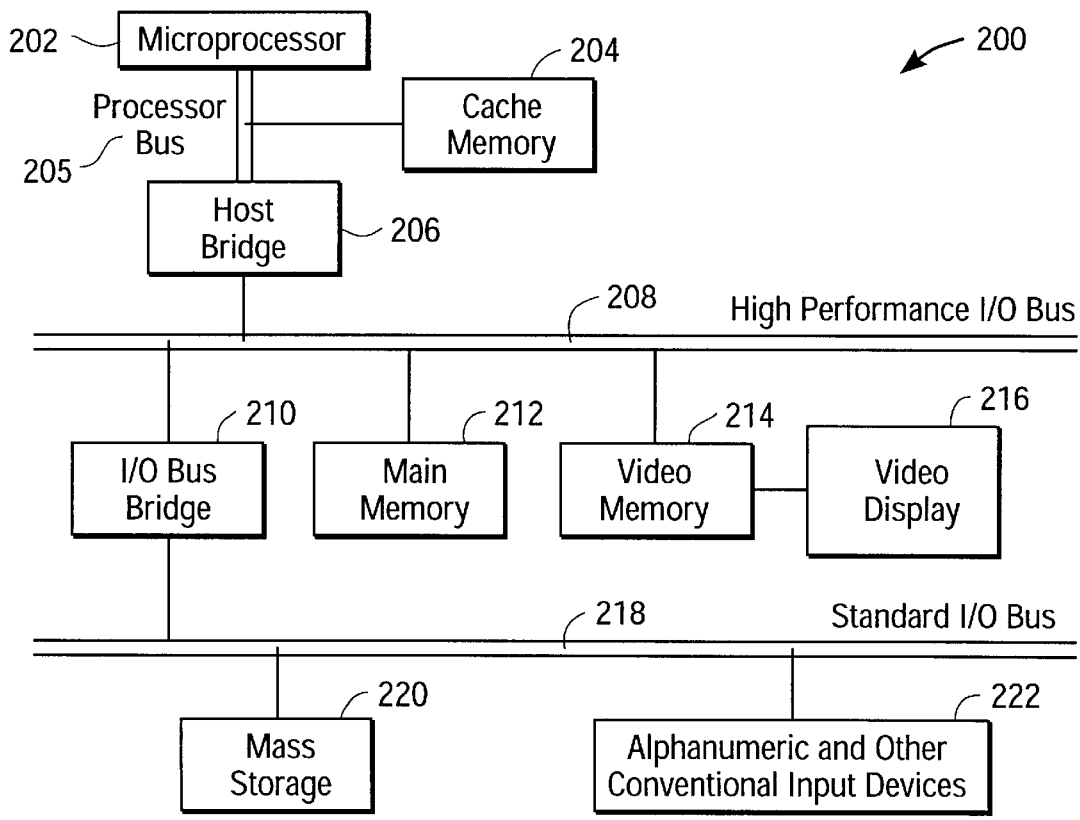
FIG. 2 illustrates a general purpose computer system architecture.

Referring to FIG. 2, the general-purpose computer system architecture comprises microprocessor 202 and cache memory 204 coupled to each other through processor bus 205. Sample computer system 200 also includes high performance I/O bus 208 and standard I/O bus 218. Processor bus 205 and high performance I/O bus 208 are bridged by host bridge 206, whereas high performance I/O bus 208 and standard I/O bus 218 are bridged by I/O bus bridge 210. Coupled to high performance I/O bus 208 are main memory 212 and video memory 214. Alternatively, main memory 212 can also be coupled to host bridge 206. Coupled to video memory 214 is video display 216. Additionally, a video processing device may also be coupled to host bridge 206. Coupled to standard I/O bus 218 are mass storage 220, network interface 224, and alphanumeric input device or other conventional input device 222. These elements perform their conventional functions well known in the art.

Detailed Operation of One Embodiment of the Paging Policy Selector

The paging policy selector dynamically adjusts its associated memory system's existing paging policy. Specifically, the selector modifies the existing paging policy according to a select signal, which is generated basing on various input signals and the existing paging policy. A memory controller may include such a paging policy selector, and thus the following paragraphs use the term "memory controller" instead of "paging policy selector".

The memory controller maintains tables of memory addresses and some status information associated with them. FIG. 3 illustrates an example of one such table. Column 300 comprises entries of memory addresses, which the memory controller monitors. Column 302 indicates whether pages pointed to by these addresses are currently open or not. "T" stands for True, or the page is open. "F", on the other hand, stands for False.

When the memory controller receives a request for memory access of a memory range, the memory controller checks the table to determine whether the desired memory range is open or is available for immediate access. If the range is open as indicated a "T" in column 302, the memory controller goes through a memory accessing procedure commonly described as "page hit". Otherwise, when accessing the requested memory range depends on closing a different page, such a memory accessing procedure is known as "page miss". Lastly, if the requested memory range is neither open nor in a state where closing a different page is necessary, then such a situation is labeled as "page empty".

FIG. 4 illustrates a block diagram for one embodiment of select-signal generator 100 and paging policy modifier 102. Starting with select-signal generator 100, the generator 100 has counter 404 and signal generator 408. More particularly, counter 404 receives input signals as shown in FIG. 1. In this embodiment, the input signals are CloseToOpen signal 400 and Re-Opening signal 402. Each time the memory controller closes a page in order to open another, CloseToOpen signal 400 is asserted. In other words, in one embodiment, the memory controller's paging policy leaves a page open until it inhibits another access. As a result, a page may remain open for a number of accesses or cycles. This type of paging policy is referred to as a non-aggressive paging policy.

In contrast, each time the memory controller opens a page which would already have been opened if not for its preemptive paging policy, Re-Opening signal 402 is asserted. Preemptive paging policy refers to a policy, which may forcefully close a page after each access. Such a policy is also refers to as an aggressive paging policy.

In one embodiment, assertion of CloseToOpen signal 400 increments counter 404, and assertion of Re-Opening 402 signal decrements counter 404. Counter 404 maintains a cumulative result of these assertions of input signals and presents the result to signal generator 408 through signal path 406. This cumulative result indicates the effectiveness of the existing paging policy. For instance, a high cumulative result suggests many pages are left open and suggests switching to an aggressive paging policy. On the contrary, a low result suggests preemptive closing of many pages when the same pages are still frequently accessed. In that low result scenario, adopting a non-aggressive paging policy may be preferred.

In addition, one embodiment of signal generator 408 establishes a threshold for switching from one paging policy to another. When the cumulative result from counter 404 reaches or exceeds the established threshold value, signal generator 408 asserts select signal 104. This threshold value can either be a predetermined and fixed value or an adjustable value.

When paging policy modifier 102 receives select signal 104, its selector 414 has a group of distinctive paging policies, such as 410 and 412, to choose from. In one embodiment, Type-I paging policy 410 is the mentioned aggressive paging policy, and Type-N paging policy 412 is the mentioned non-aggressive paging policy. Depending on the value of select signal 104, either existing paging policy 106 remains unchanged or is replaced by either 410 or 412.

Figure 5:
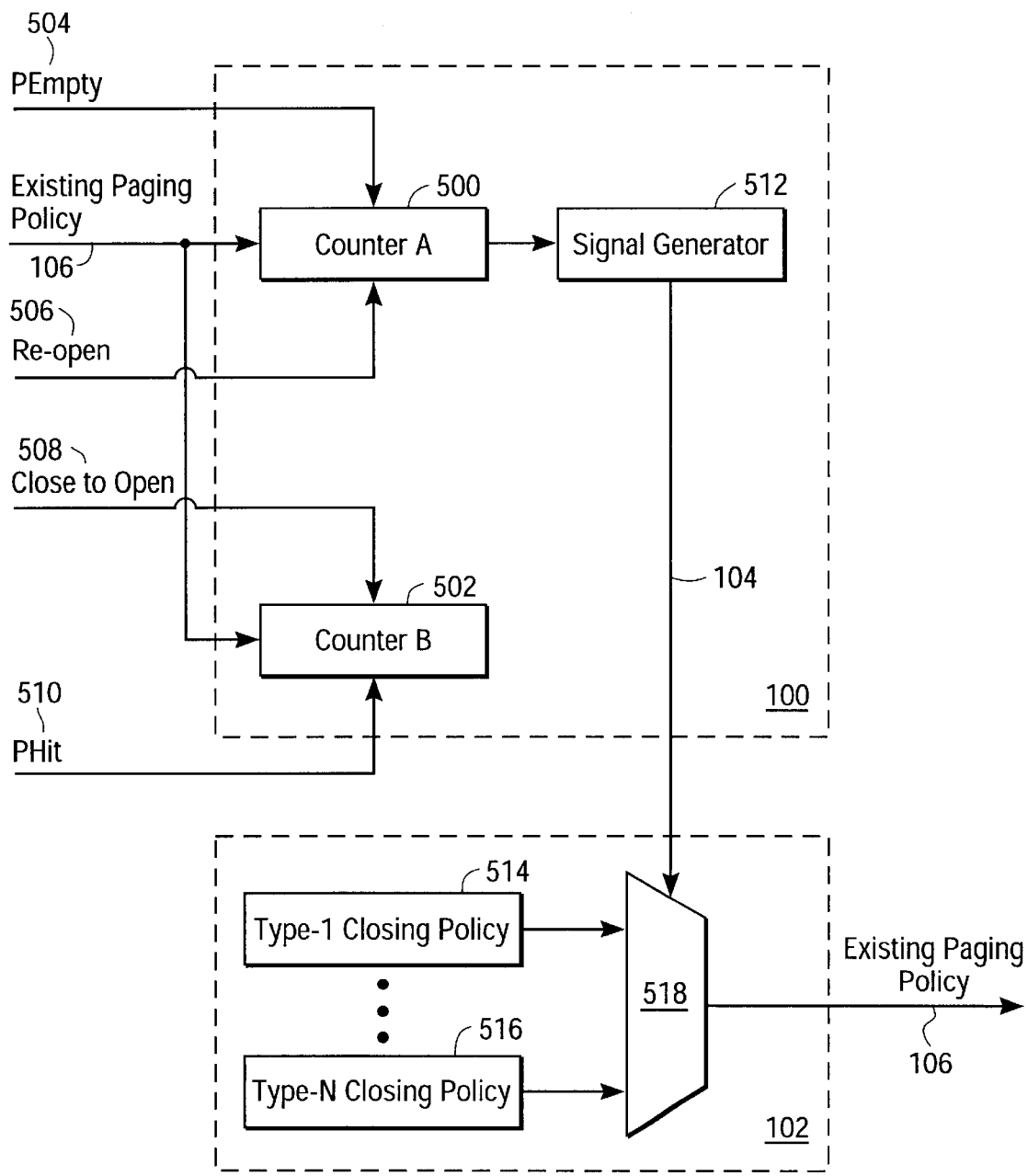
FIG. 5 illustrates a detailed block diagram of another embodiment of a select-signal generator and a paging policy modifier.

FIG. 5 demonstrates a block diagram of another embodiment of select-signal generator 100 and paging policy modifier 102. Unlike the embodiment shown in FIG. 4, this embodiment utilizes two counters and has four input signals. Moreover, the two counters, counter A 500 and counter B 502, are enabled separately depending on existing paging policy 106. Specifically, when existing paging policy 106 is an aggressive paging policy, counter A 500 is enabled. When it is a non-aggressive paging policy, counter B 502 is enabled. Counter A 500 and B 502 also receive input signals, such as Pempty signal 504, Re-Open signal 506, CloseToOpen signal 508 and PHit signal 510.

Figure 6:
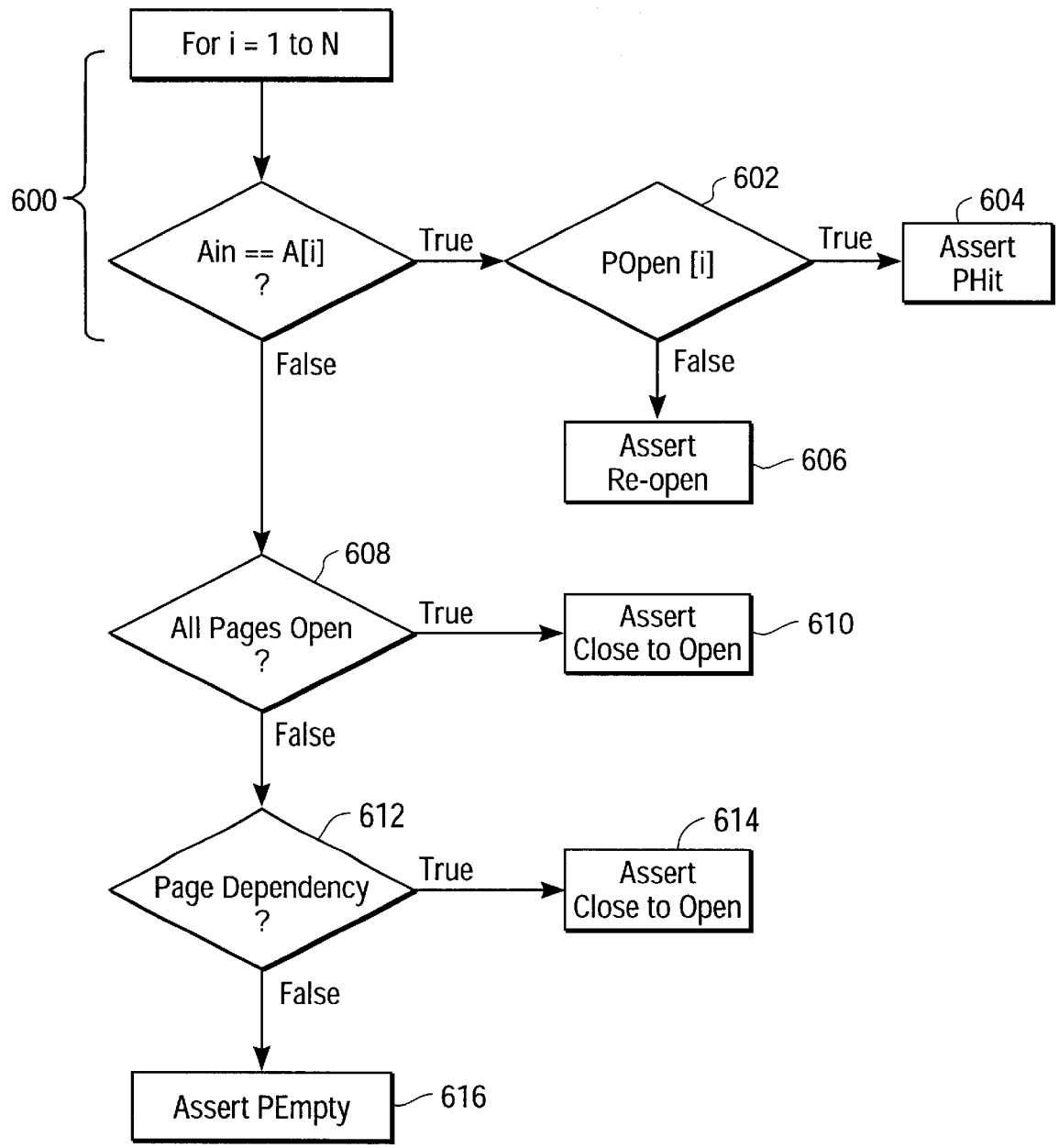
FIG. 6 is a flow chart of one embodiment of a process for asserting input signals.

In conjunction with the previously discussed memory entry table 304, FIG. 6 illustrates a flow chart of a process to assert these aforementioned input signals. In particular, the FOR loop (block 600) compares every entry of memory entry table 304 with the requested memory address, Ain. When there is a match, the corresponding PageOpen field shown in column 302 is checked (block 602). If the field in column 302 indicates true, the page corresponding to the requested memory address is open and PHit signal 510 is asserted (block 604). Asserting PHit signal 510 suggests an occurrence of the previously described "page hit" situation. However, if the field in column 302 indicates false, Re-Open signal 506 is asserted. In other words, the previously described "page miss" situation has occurred.

On the other hand, if the FOR loop (block 600) does not identity any matching entries in memory entry table 304 for the requested memory address and all entries in the table are indicated to be open (block 608), CloseToOpen signal 508 is then asserted (block 610). Thus, before opening another page, closing of a different page is required. Similarly, even if not all the pages are open, as long as opening a page depends on closing another page (block 612), CloseToOpen signal 508 is still asserted. When no page dependency exists and the requested memory address is not in memory entry table 304, PEmpty 504 signal is asserted (block 616).

Figure 7:
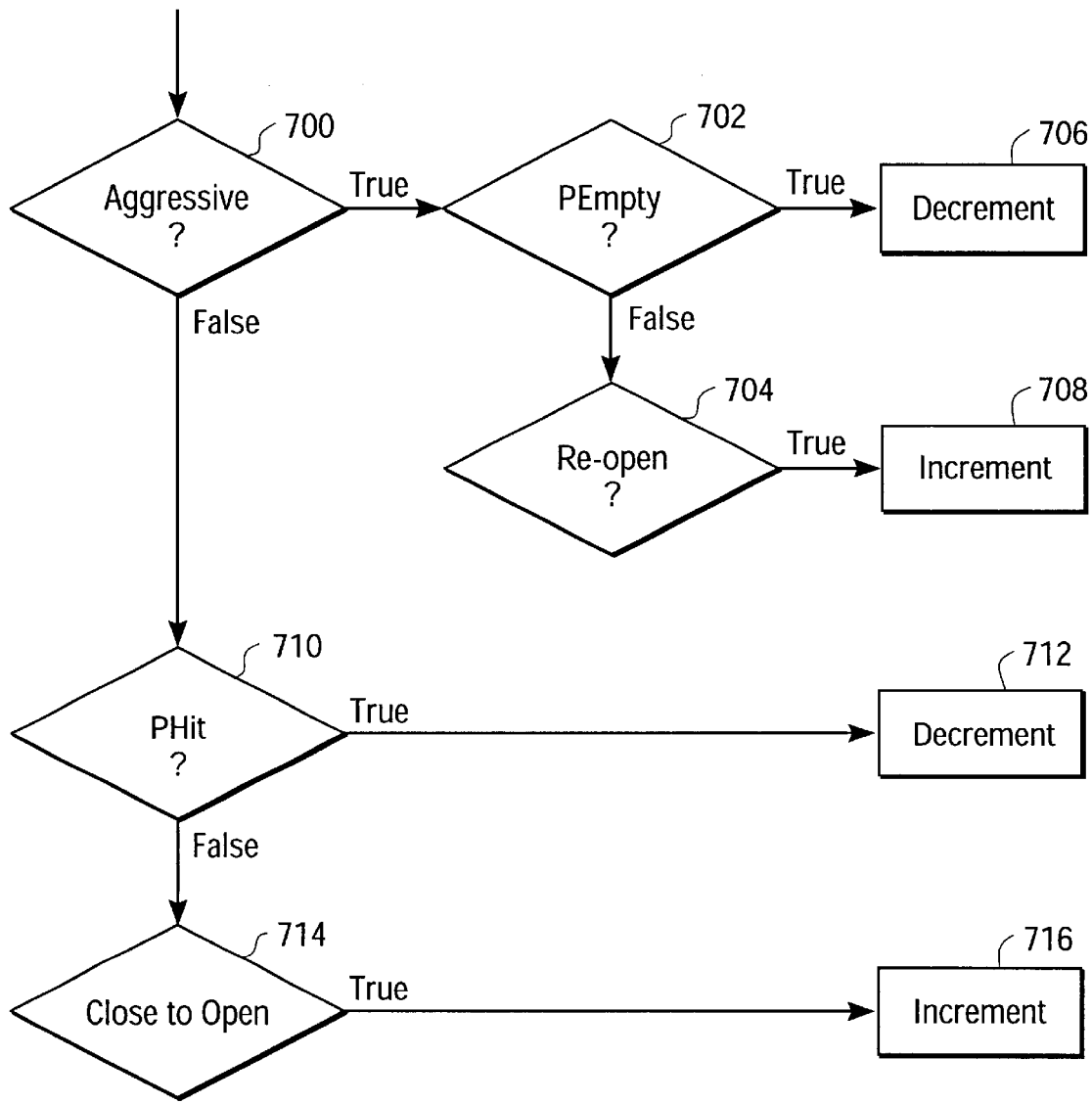
FIG. 7 is a flow chart of one embodiment of a process for incrementing and decrementing different counters.

FIG. 7 shows a flow chart for incrementing and decrementing counter A 500 and counter B 502 with these discussed input signals. If existing paging policy 106 is shown to be the aggressive paging policy (block 700) and PEmpty signal 504 is shown to have been asserted (block 702), counter A 500 is enabled and decremented (block 706). Nevertheless, with the aggressive paging policy, if PEmpty signal 504 has not been asserted but Re-Open signal 506 has, counter A 500 is incremented (block 708). Since the aggressive paging policy preemptively closes pages, too many assertions of Re-Open signal 506 suggest changing to a non-aggressive paging policy. On the other hand, assertions of PEmpty signal 504 suggest a lack of page dependencies and maintain the aggressive paging policy as existing paging policy 106.

When existing paging policy 106 is a non-aggressive paging policy and PHit signal 510 is shown to have been asserted (block 710), counter B 502 is decremented (block 712). If PHit signal 510 is not asserted but CloseToOpen signal 508 is, counter B 502 is incremented (block 714). As has been mentioned previously, a non-aggressive paging policy often leaves pages open for some number of accesses or cycles before closing them. Assertions of PHit signal 510 signify occurrences of page hits and maintain the non-aggressive paging policy as existing paging policy 106. On the contrary, assertions of CloseToOpen signal 508 suggest page dependencies and also suggest switching to the aggressive paging policy.

Figure 8:
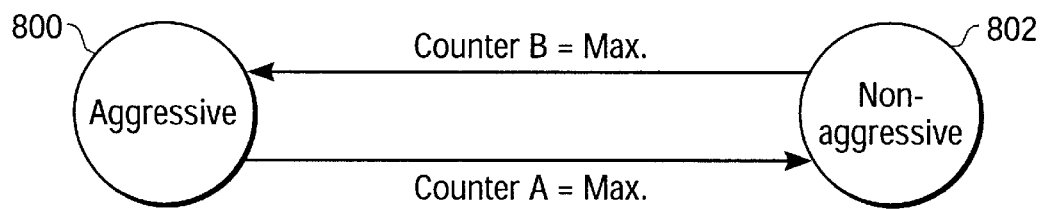
FIG. 8 illustrates a state diagram of one embodiment for transitioning between an aggressive paging policy and a non-aggressive paging policy.

One embodiment of the disclosed select-signal generator 100 and paging policy modifier 102 as shown in FIG. 5 may adopt a state machine implementation. Specifically, FIG. 8 illustrates transitions between state 800, where an aggressive paging policy is adopted, and state 802, where a non-aggressive paging policy is enforced. When counter A 500 reaches a predetermined threshold, or Max as denoted in FIG. 8, state 800 transitions to state 802. Similarly, when counter B 502 reaches Max, state 802 transitions to state 800.

It should be emphasized that although two paging policies, aggressive and non-aggressive, are discussed specifically, the disclosed paging policy modifier 102 may select from more than two distinct types of paging policies to generate existing paging policy 106. Moreover, although up to four input signals are illustrated in the figures, the disclosed select-signal generator may handle many more input signals than the described four. Finally, although assertions of particular input signals increment or decrement counter A 500 and counter B 502, it should have been apparent to one ordinarily skilled in the art to assert other input signals and manage counters differently without exceeding the scope of this disclosure. For example, the select-signal generator may look for particular trigger patterns formed by the input signals rather than tracking the number of assertions of the input signals.

Thus, a method and apparatus of dynamically adjusting a memory system's existing paging policy have been disclosed. Although the method and apparatus have been described particularly with reference to the figures, the method and apparatus may appear in any number of systems and still perform all the discussed functionality. It is further contemplated that many changes and modifications may be made by one of ordinary skill in the art without departing from the spirit and scope of the disclosure.

What is claimed is:

1. A method of dynamically adjusting an existing paging policy of a memory system, comprising:

generating a select signal according to at least one input signal and the existing paging policy, wherein generating the select signal comprises tracking a number of assertions of the input signal and generating the select signal according to the tracked number, wherein tracking the number of assertions of the input signal comprises incrementing a plurality of counters with assertions of a first set of the input signals; and decrementing the counters with assertions of a second set of the input signals; and modifying the existing paging policy based on the select signal.

2. The method according to claim 1, wherein the assertions of the first set of the input signals occur when the memory system closes a page in order to open another.

3. The method according to claim 1, wherein the assertions of the second set of the input signals occur when the memory system reopens a page which has been preemptively closed.

4. The method according to claim 1, wherein the assertions of the first set of the input signals occur when the memory system reopens a page which has been preemptively closed.

5. The method according to claim 1, wherein the assertions of the second set of the input signals occur when the memory system closes a page in order to open another.

6. The method according to claim 1, wherein the incrementing and decrementing of the counters further base on the existing paging policy.

7. The method according to claim 1, further comprising:

establishing a threshold level; and generating the select signal when the tracked number reaches or exceeds the threshold level.

8. The method according to claim 1, wherein modifying the existing paging policy further comprises:

maintaining a plurality of distinctive paging policies; and selecting the existing paging policy from the distinctive paging policies according to the select signal.

9. An apparatus for dynamically adjusting an existing paging policy of a memory system, comprising:

a select-signal generator to generate a select signal according to at least one input signal and the existing paging policy, wherein the select signal generator comprises a plurality of counters to track a number of assertions of the input signal and a signal generator, coupled to the plurality of counters, to generate the select signal according to the tracked number, wherein the plurality of counters increment with assertions of a first set of the input signals and decrement with assertions of a second set of the input signals; and a paging policy modifier, coupled to the select-signal generator, to modify the existing paging policy based on the select signal.

10. The apparatus according to claim 8, wherein assertions of the first set of the input signals occur when a page is being closed in order to open another page.

11. The apparatus according to claim 8, wherein assertions of the second set of the input signals occur when a page which has been preemptively closed is being reopened.

12. The apparatus according to claim 8, wherein assertions of the first set of the input signals occur when a page which has been preemptively closed is being reopened.

13. The apparatus according to claim 8, wherein assertions of the second set of the input signals occur when a page is being closed in order to open another page.

14. The apparatus according to claim 8, wherein the counters' incrementing and decrementing is further based on the existing paging policy.

15. The apparatus according to claim 8, wherein the signal generator establishes a threshold level and generates the select signal when the tracked number reaches or exceeds the threshold level.

16. The apparatus according claim 8, wherein the paging policy modifier further comprises:
   a selector to select the existing paging policy from a plurality of distinctive paging policies according to the select signal.

17. An electronic system for dynamically adjusting an existing paging policy of a memory system, comprising:
   an Input/Output (I/O) bus;
   a plurality of microprocessors, coupled to the I/O bus; and
   the memory system, coupled to the I/O bus, wherein the memory system further comprises
      a select-signal generator to generate a select signal according to at least one input signal and the existing paging policy, the select-signal generator further comprising a plurality of counters to track a number of assertions of the input signals and a signal generator, coupled to the plurality of counters, to generate the select signal according to the tracked number, wherein the plurality of counters increment with assertions of a first set of the input signals and decrement with assertions of a second set of the input signals; and
      a paging policy modifier, coupled to the select-signal generator, to modify the existing paging policy based on the select signal.

18. The electronic system according to claim 17, wherein assertions of the first set of the input signals occur when the memory system closes a page in order to open another page.

19. The electronic system according to claim 17, wherein assertions of the second set of the input signals occur when the memory system reopens a page which has been preemptively closed.

20. The electronic system according to claim 17, wherein assertions of the first set of the input signals occur when the memory system reopens a page which has been preemptively closed.

21. The electronic system according to claim 17, wherein assertions of the second set of the input signals occur when the memory system closes a page in order to open another page.

22. The electronic system according to claim 17, wherein the counters' incrementing and decrementing is further based on the existing paging policy.

23. The electronic system according to claim 17, wherein the signal generator establishes a threshold level and generates the select signal when the tracked number reaches or exceeds the threshold level.

24. The electronic system according claim 17, wherein the paging policy modifier further comprises:
   a selector to select the existing paging policy from a plurality of distinctive paging policies according to the select signal.

* * * * *

UNITED STATES PATENT AND TRADEMARK OFFICE
CERTIFICATE OF CORRECTION

PATENT NO.    : 6,604,186 B1
DATED         : August 5, 2003
INVENTOR(S)   : Fanning It is certified that error appears in the above-identified patent and that said Letters Patent is hereby corrected as shown below:

Column 4,
Line 24, delete "-I" and insert -- -1 --.

Signed and Sealed this

Thirteenth Day of January, 2004

JON W. DUDAS
*Acting Director of the United States Patent and Trademark Office*